(12) United States Patent
Halasz et al.

(10) Patent No.: US 7,181,530 B1
(45) Date of Patent: Feb. 20, 2007

(54) ROGUE AP DETECTION

(75) Inventors: David E. Halasz, Stow, OH (US); Merwyn B. Andrade, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 09/917,122

(22) Filed: Jul. 27, 2001

(51) Int. Cl.
*G06F 15/173* (2006.01)

(52) U.S. Cl. ....................... 709/238; 709/228

(58) Field of Classification Search ................ 709/242, 709/239, 227, 231, 238, 228; 713/169, 200, 713/201, 163, 168, 179, 166; 370/351; 726/4, 726/8; 463/42
See application file for complete search history.

(56) References Cited

U.S. PATENT DOCUMENTS

| | | | |
|---|---|---|---|
| 6,115,376 A * | 9/2000 | Sherer et al. ................ 370/389 |
| 6,243,811 B1 * | 6/2001 | Patel ........................... 713/167 |
| 6,304,551 B1 * | 10/2001 | Ramamurthy et al. ...... 370/232 |
| 6,351,773 B1 * | 2/2002 | Fijolek et al. ............... 709/228 |
| 6,408,347 B1 * | 6/2002 | Smith et al. .................... 710/36 |
| 6,611,522 B1 * | 8/2003 | Zheng et al. ........... 370/395.21 |
| 6,728,782 B1 * | 4/2004 | D'Souza et al. ............ 709/242 |
| 6,748,543 B1 * | 6/2004 | Vilhuber ........................ 726/8 |
| 6,754,182 B1 * | 6/2004 | Aznar et al. ................. 370/252 |
| 6,766,453 B1 * | 7/2004 | Nessett et al. .............. 713/171 |
| 6,865,673 B1 * | 3/2005 | Nessett et al. .............. 713/155 |
| 6,866,586 B2 * | 3/2005 | Oberberger et al. ........... 463/42 |
| 6,917,804 B2 * | 7/2005 | Takayama et al. ........ 455/432.1 |
| 6,952,781 B1 * | 10/2005 | Chang et al. .................... 726/4 |
| 6,954,790 B2 * | 10/2005 | Forslow ..................... 709/227 |
| 6,970,459 B1 * | 11/2005 | Meier ......................... 370/389 |

(Continued)

OTHER PUBLICATIONS

Efficient Cryptographic Schemes Provably as Secure as Subset Sum—Impagliazzo, Naor (1996) www-cse.ucsd.edu/users/russell/moni.ps.*

(Continued)

*Primary Examiner*—Thong Vu
(74) *Attorney, Agent, or Firm*—Tucker Ellis & West LLP

(57) ABSTRACT

A method of detecting a rogue access point is disclosed. A message is directed from a supplicant to a network through an access point. A network response message is received by the supplicant from the access point. A step of determining whether the access point is one of a valid network access point and a rogue access point is performed based on whether the received network response message is respectively in conformity or nonconformity with predetermined expectations. If the access point is determined to be a rogue access point, it is reported to the network. If the access point is determined to be a valid network access point, the supplicant is authenticated to the network.

19 Claims, 4 Drawing Sheets

U.S. PATENT DOCUMENTS

| | | | |
|---|---|---|---|
| 2002/0056043 A1* | 5/2002 | Glass | 713/179 |
| 2002/0075844 A1* | 6/2002 | Hagen | 370/351 |
| 2002/0085719 A1* | 7/2002 | Crosbie | 380/248 |
| 2002/0087882 A1* | 7/2002 | Schneier et al. | 713/201 |
| 2002/0174335 A1* | 11/2002 | Zhang et al. | 713/168 |
| 2002/0176366 A1* | 11/2002 | Ayyagari et al. | 370/245 |
| 2002/0197979 A1* | 12/2002 | Vanderveen | 455/410 |
| 2003/0037237 A1* | 2/2003 | Abgrall et al. | 713/166 |
| 2003/0065805 A1* | 4/2003 | Barnes, Jr. | 709/231 |
| 2005/0094640 A1* | 5/2005 | Howe | 370/395.1 |
| 2005/0187883 A1* | 8/2005 | Bishop et al. | 705/67 |

OTHER PUBLICATIONS

Combinatorial Properties and Constructions of Traceability..—Stinson, Wei (1998) www.math.unl.edu/~rwei/ntsfc.ps.*

SDP: Session Description Protocol (draft 02.1)—Handley, Van Jacobson (1996) ftp.isi.edu/confctrl/docs/sdp.02.1.ps.Z.*

Inductive Analysis of the Internet Protocol TLS—Paulson (1997) www.cl.cam.ac.uk/users/lcp/papers/tls.ps.gz.*

* cited by examiner

ROGUE AP DETECTION

BACKGROUND OF THE INVENTION

The present invention is directed to the field of security measures for wireless LAN technology. In a wireless local area network (or WLAN) a wireless client seeks to connect to the network in order to exchange data. There are three states in connecting to the network as specified by the IEEE 802.11 specification for WLANs:
1. Unauthenticated and Unassociated
2. Authenticated and Unassociated
3. Authenticated and Associated.

Authentication is the process of verifying the credentials of a client desiring to join a WLAN. Association is the process of associating a client with a given Access Point (AP) in the WLAN. IEEE 802.11 defines two types of authentication methods—Open Key System Authentication and Shared Key Authentication. A successful completion of the association and authentication phases allows a WLAN node successful entry into the WLAN subsystem.

The IEEE 802.11b standard attempts to provide "privacy of a wire" using an optional encryption scheme called "Wired Equivalent Privacy" (or WEP) in which a data frame or "payload" is run through an encryption algorithm, the output of which replaces the original payload. With "open key authentication" the entire authentication process is done in clear text. This means since the entire process is performed without encryption, a client can associate to the AP with the wrong WEP key or no WEP key. But as soon as the client tries to send or receive data it is denied access for not having the correct key to process the packet. With "shared key authentication" there is a challenge text packet that is sent within the authentication process. If the client has the wrong key or no key it will fail this portion of the authentication process and will not be allowed to associate to the AP.

This choice (open or shared key) is manually set on each device (AP and client). There should be a match in the method chosen by the client and the AP for the association to succeed. The default value is for open authentication.

The entire process can be broken down into three phases:
1) Probe Phase

When a client is initialized it first sends a "probe request" packet out on all the channels. The APs that hear this packet will then send a "probe response" packet back to the station. This probe response packet contains information such as SSID (Service Set Identifier), which the client utilizes to determine which AP to continue the association process with.

2) Authentication Phase

After the client determines which AP to continue association process with, it begin the authentication phase based upon the probe response packet. This phase can be performed in either open or shared key mode. The client and the access point both have to be set-up to the same authentication scheme for this phase to be performed properly.

OPEN AUTHENTICATION SCHEME: The client sends an authentication request to the AP. The AP then processes this request and determines (based on the configured policies) whether or not to allow the client to proceed with the association phase. The AP sends an authentication response packet back to the client. Based upon the type of response (pass or fail) from the AP, the client will either continue or discontinue the association process.

SHARED KEY AUTHENTICATION: The client sends an authentication request to the AP. The AP processes this request, generates and sends a challenge text packet to the client. The client is then required to encrypt the packet utilizing its already-configured WEP key and send the packet back up to the AP. The AP then determines if it can decipher the packet correctly. Based upon this test, the AP will send either a pass or fail in the authentication response packet to the client that determines if the client is allowed to continue the association phase or not.

3) Association Phase

When the client successfully completes the authentication phase (for example, receives a successful authentication response packet from the AP), it proceeds to the association phase. The client sends an association request packet to the AP. The AP analyses the information in this packet and if it passes, the AP adds the client to its association table. It then sends an association response packet to the client, which completes the association phase.

One of the primary drawbacks with the IEEE 802.11 shared key authentication scheme is that there is no mutual authentication between the client and the AP. Only the client authenticates to the access point but the access point does not authenticate to the client. This opens up the doors for denial of service attacks via rogue APs in the WLAN. Such attacks redirect legitimate users having their data open to plaintext or other attacks by associating with APs that are masquerading as members of the WLAN sub system. Mutual authentication between the client and the AP that requires both sides to prove their legitimacy within a reasonable time is critical to detecting and isolating rogue access points.

The existing IEEE 802.11b standard is severely handicapped with its availability for only the current open and shared key authentication scheme that is essentially non-extensible. WLAN customers will demand and expect to receive flexibility in next generation security solutions. Some of these requirements include the addition of new 802.11 authentication methods. The authentication methods need to remain independent of the underlying 802.11 hardware to the greatest extent possible since hard-coding any authentication methods makes it difficult to respond to security vulnerabilities that are constantly discovered and that require quick rollout of fixes. Extensibility is required in order to support Public Key Infrastructure (PKI) and certificate schemes There is no standard mechanism that allows a network administrator to control access to and from a LAN segment based on the authenticated state of a port user. Simple network connectivity affords anonymous access to enterprise data and the global internet. As 802 LANs are deployed in more accessible areas, there is an increasing need to authenticate and authorize basic network access. The proposed project will provide common interoperable solutions using standards based authentication and authorization infrastructures already supporting schemes such as dial up access.

SUMMARY OF THE INVENTION

In view of the difficulties and drawbacks associated with the previous systems, there is a need for an authentication method that remains independent of the underlying hardware.

There is also a need for an authentication method that enables responsiveness to security vulnerabilities and a quick rollout of fixes.

There is also a need for a system and method that provides extensibility in order to support PKI and certificate schemes.

There is also a need for a system and method that decreases hardware cost and complexity.

There is also a need for a system and method that enables customers to choose their own security solution.

There is also a need for a system and method that permits the implementation of the latest, most sophisticated authentication and key management techniques with modest hardware.

There is also a need for a system and method that enables rapid development response to security issues.

These needs and others are satisfied by the method and implementation for network authentication of the present invention as disclosed herein. The invention is realized in a method of detecting a rogue access point comprising the steps of directing a message from a supplicant to a network through an access point and receiving a network response message by the supplicant from the access point. A step of determining whether the access point is one of a valid network access point and a rogue access point is included based on whether the received network response message is respectively in conformity and nonconformity with predetermined expectations.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

The present invention contemplates a flexible security framework to support enhancements that would overcome the disadvantages of previous systems. Cisco, Microsoft and several other vendors have endorsed the role of the developing IEEE 802.1X standard as the preferred framework for edge security and are actively participating in the standardization efforts to foster interoperable implementations. The IEEE 802.1X Working Group is chartered with the goal of providing an interoperable security framework for port based access control that resides in the upper layers (for example, above the MAC layer). The primary philosophy for the port based access control layer is to enable the plug-in of new authentication schemes and key management methods without changing switches, NICs, Access Points, and so on. Another goal is to also leverage the main CPU resources for cryptographic calculations. This security philosophy is intended to provide end users and customers with decreased hardware cost and complexity, to enable customers to choose their own security solution, to permit the implementation of the latest, most sophisticated authentication and key management techniques with modest hardware, and to enable rapid development response to security issues.

When a host connects to the LAN port on a 802.1X switch and Access Point, the authenticity of the host is determined by the switch port according to the protocol specified by 802.1X, before the services offered by the switch are made available on that port. Until the authentication is complete, only EAPOL (see below) frames are allowed to be sent and received on that port. Once the host authentication is successful, the port switches traffic as a regular port. As an example, when a Windows 2000 PC is hooked on to a LAN switch port, and when a user logs in, the switch sends a message requesting the PC to identify itself. When the PC responds back with an identity frame, the switch makes use of the service of an authentication server to verify the credentials of the user. If the authentication server informs that the user is authentic, then the switch opens its port for providing the network services of the switch.

Figure 1:
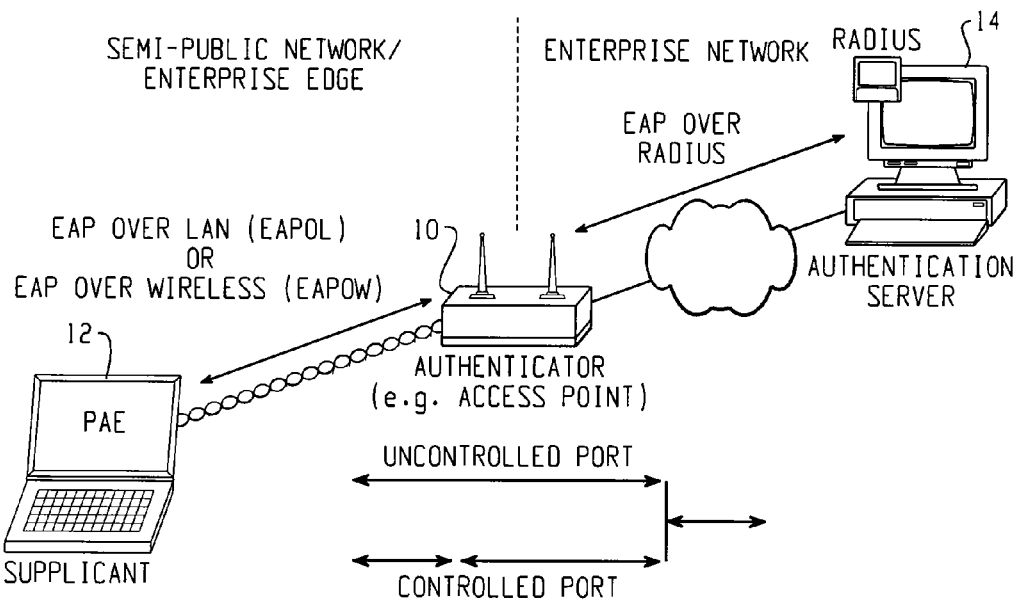
FIGS. 1 and 2 illustrate a network authentication arrangement in accordance with the present invention.

As used herein in describing the present invention and as shown in FIG. 1, a "port" is a single point of attachment to the LAN infrastructure—for example, ports of MAC Bridges. A "Port Access Entity" (PAE) operates the algorithms and protocols associated with the authentication mechanisms for a given port of the system. An "authenticator PAE" 10 is an access point that wishes to enforce authentication before allowing access to services that are accessible via that port. The authenticator PAE 10 is responsible for communication with the supplicant, and for submitting the information received from the supplicant to a suitable authentication server in order for the credentials to be checked and for the consequent authorization state to be determined. The functionality of authenticator PAEs is independent of the actual authentication method. It merely acts as a pass-through for the authentication exchange, for example, a switch port. The "supplicant PAE" 12 is a PAE that wishes to access the services accessible via the authenticator. The supplicant PAE is responsible for responding to requests from the authenticator 10 for information that will establish its credentials, for example, an end-user PC, e.g. a Windows 2000 PC connected to the LAN switch port. An "authentication server" 14 verifies the credentials of the supplicant 12. It indicates in response whether or not the supplicant 12 is authorized to access the authenticator's services. It basically provides the authentication service for the authenticator PAE 10 that acts as a client, for example, a RADIUS server.

Figure 2:
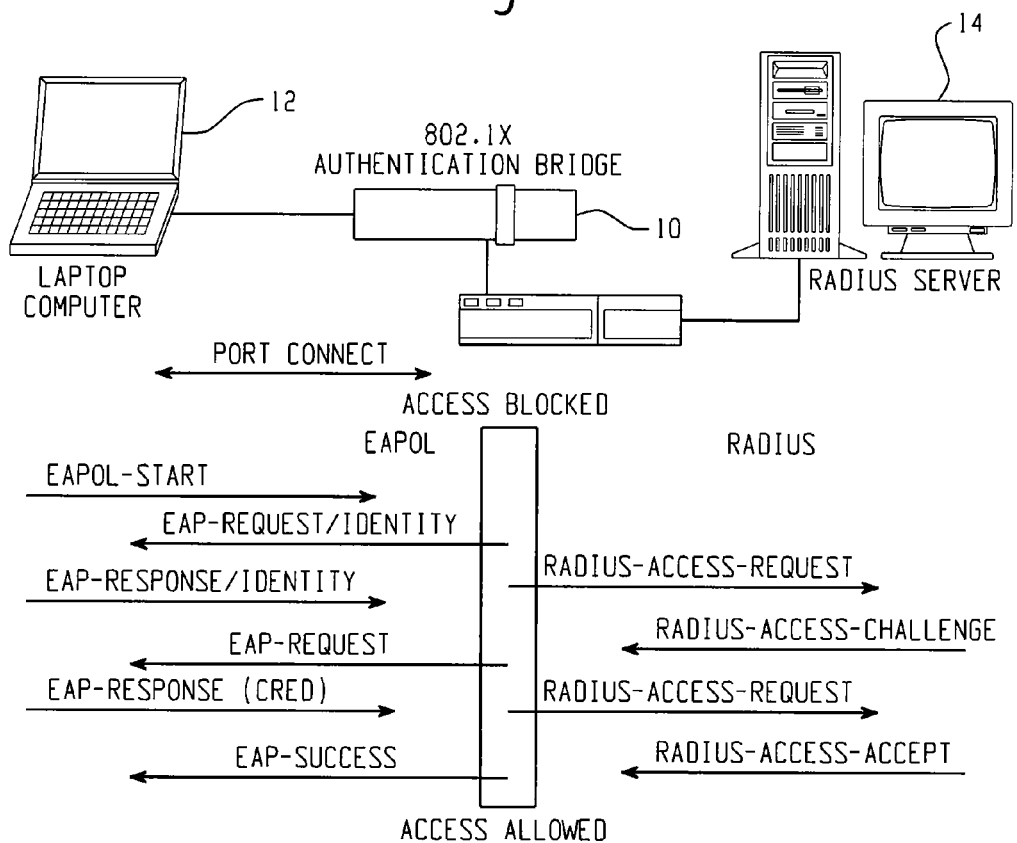

The IEEE 802.1X standard makes authentication more generic rather than enforcing a specific mechanism on the devices. 802.1X makes use of Extensible Authentication Protocol (EAP) for communication information. The 802.1X standard defines a standard for encapsulating the Extensible Authentication Protocol messages to that they can be handled directly by a LAN MAC service. This encapsulated form of an EAP frame is known as an Extensible Authentication Protocol Over LAN (EAPOL) frame and is defined in the standard. Alternatively, with Extensible Authentication Protocol Over Wireless (EAPOW), the EAPOL messages described earlier are encapsulated over 802.11 wireless frames. The packet exchange for an IEEE 802.1X conversation using EAP is highlighted in FIG. 2. These messages are a sub set of the 802.1X for 802.11 implementation described below since there is no WEP key required for wired 802.1X networks.

The EAP protocol described above was originally designed to provide an extensible method for a "point-to-point protocol" (PPP) server to authenticate its clients and possibly for the client to authenticate the server. The protocol describes an extensible packet exchange to allow the passing of authentication information between the client and the PPP server. Normally PPP servers rely on a centralized authentication server to validate the clients on their behalf. One of the more popular types of servers is a RADIUS server. Extensions to the RADIUS protocol have been contemplated to allow the passing of the EAP packets between the authentication server and the PPP server. In this case the PPP server is just a relay agent with the authentication conversation happening between the client and the RADIUS server. The RADIUS server informs the PPP server of the result of the authentication and whether to allow the client to access the network.

It has been contemplated to adapt EAP to WLANs using Public Key Infrastructure (PKI) with EAP-TLS as the authentication method. However, PKI schemes are very compute-intensive on the client systems, require careful planning and design of the overall architecture, and the overall solution costs may be prohibitive for typical enterprises. The only other defined authentication method EAP-MD5 was inadequate, as it does not support mutual authentication between the client and the authentication server.

The EAP protocol was designed so that any type of network access server could use it to validate its clients. In the case of a wireless access point the link to its radio client is not a PPP link but a WLAN. The IEEE 802.1X EAP over LAN (EAPOL) specification defines a method for encapsulating EAP packets in either Ethernet or token ring packets such that they may be transmitted over a LAN. The 802.11 specification also allows for data traffic between the client and access point to be encrypted using a WEP encryption key. In early implementations, the access point would have a single key, which had to be programmed into each client radio and all traffic in the wireless cell would be encrypted with the single key.

The present invention includes a newly-developed protocol called the "light extensible authentication protocol" (EAP-Cisco Wireless or "LEAP") authentication type. With the present invention, using EAP authentication, the client and RADIUS server have a shared secret, usually a username and password combination. The RADIUS can pass enough information to the access point such that the client and access point may independently derive an encryption key that is unique for this client-access point pair. EAP-Cisco Wireless offers the following benefits: requires minimal support from the client CPU while offering mutual authentication; support for embedded systems, such as printers; support for host machines running operating systems that did not have the support for native EAP or routines to allow the use of the PKI authentication; and support for all popular operating systems such as Windows 95, Windows 98, Windows NT, Windows 2000, Windows Millennium, Windows CE, Linux and Mac OS 9.X.

Figure 3:
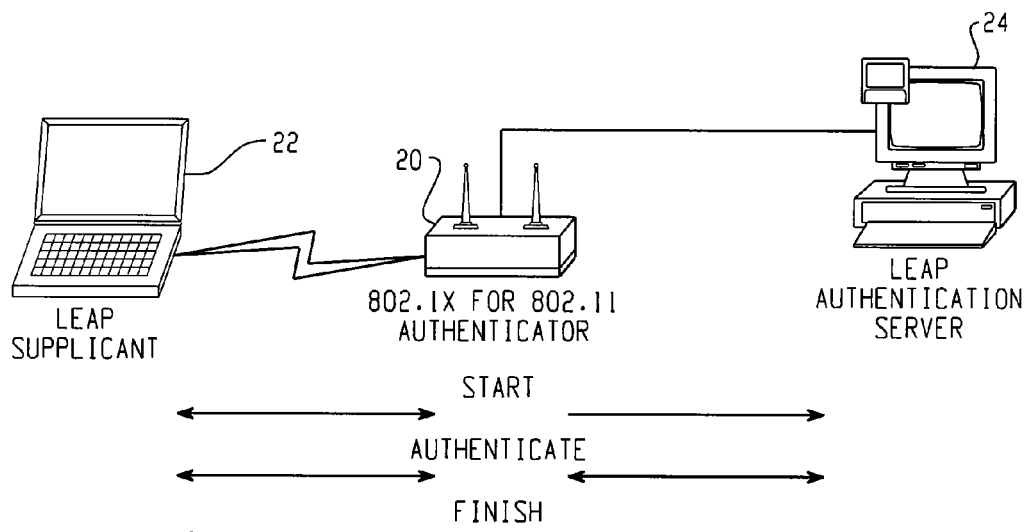
FIGS. 3 through 7 depict steps in the authentication process in accordance with the present invention.

In a preferred embodiment of the present invention, as shown in the figures, the present invention satisfies the critical security requirements of large enterprises while offering hassle-free WLAN deployment. The illustrated design preferably includes the following WLAN security Components: Cisco Secure Access Control Server version 2.6, running on Windows NT Server or Windows 2000 Server, used for AAA and EAP RADIUS services; Cisco Aironet Series access points supporting software version 11.0 or greater for 802.1x EAP authenticator support; and Cisco Aironet client adapters with firmware 4.10 or greater that provide support for integrated network logon and EAP-Cisco Wireless authentication. This exemplary embodiment has been observed to demonstrate the following benefits to enterprise customers: Centralized Authentication and Key distribution; mutual authentication between the WLAN client and the AAA server; broad operating system support; immunity to several WLAN security attacks including rogue AP; and an extensible framework to enable uniform enterprise perimeter security As shown in FIG. 3, the EAP-Cisco Wireless implementation in accordance with the preferred embodiment comprises three components described as follows. A EAP-Cisco Wireless supplicant 22 is provided, available as a driver update for Windows 95, 98, NT, 2000, Windows Millennium, WinCE, Linus and Mac OS 9.X. This EAP-Cisco Wireless supplicant 22 is preferably a piece of client software and firmware that resides on the host PC with the WLAN adapter. The EAP-Cisco Wireless supplicant 22 can be set-up to either have the username and password stored in the WLAN NIC card or to have it be manually entered via a network logon process. An 802.1X for 802.11 authenticator 20 is provided to be available as a software update for Cisco 340 series and newer access points. A EAP-Cisco Wireless authentication server 24 is preferably a RADIUS Server that implements EAP-Cisco Wireless authentication, preferably the Cisco Secure Access Control Server (ACS) Version 2.6. The entire authentication and key distribution process is accomplished in three phases, Start, Authenticate and Finish as illustrated in FIG. 3.

Figure 4:
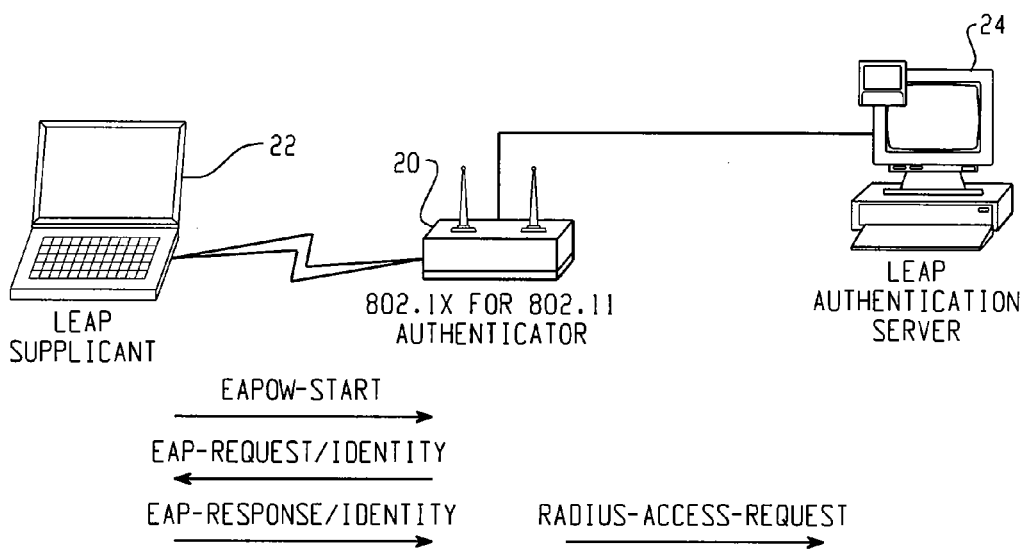

FIGS. 4 through 7 summarize the different packet exchanges for each phase between the EAP-Cisco Wireless supplicant 22, the access point authenticator 20, and the EAP-Cisco Wireless-RADIUS server 24. FIG. 4 shows an 802.1X over 802.11 exchange using the EAP-Cisco Wireless authentication protocol.

The start phase of EAP-Cisco Wireless Authentication is shown in FIG. 4. In the start phase the following packets are exchanged between the entities. The EAPOW-Start (or EAPOL-Start in 802.1X for Wired networks) is used to start the authentication process and is directed by the client/supplicant 22 to the AP/authenticator 20, in accordance with 802.1X. The EAP-Request/Identity is used by the AP/Authenticator 20 to request the client's/supplicant's identity, in accordance with the message definition in RFC 2284. The EAP-Response/Identity is used by the client/supplicant 22 to deliver the identifying user name and password to the AP/Authenticator 20, in accordance with the definition in RFC 2284.

Figure 5:
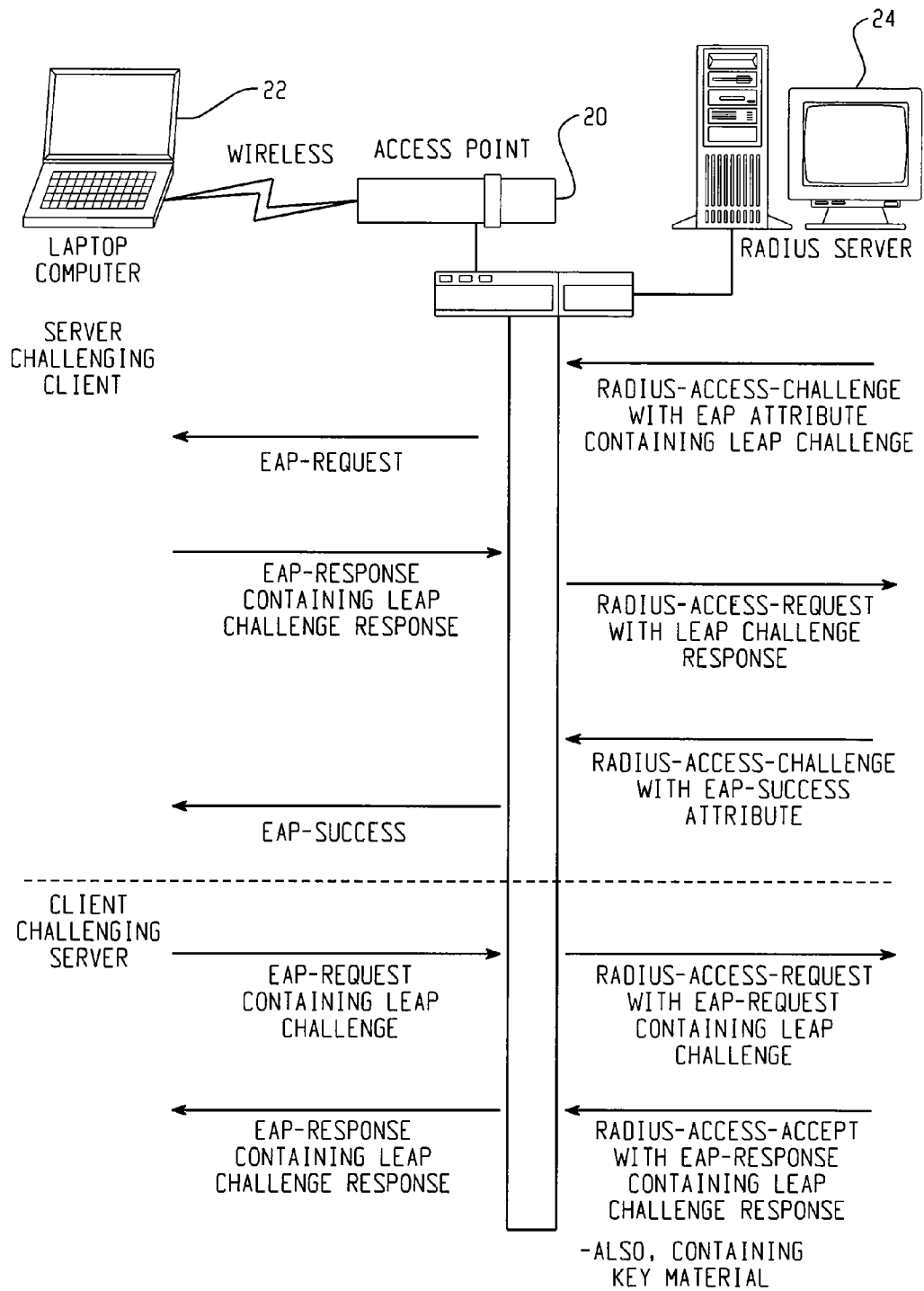
Figure 6:
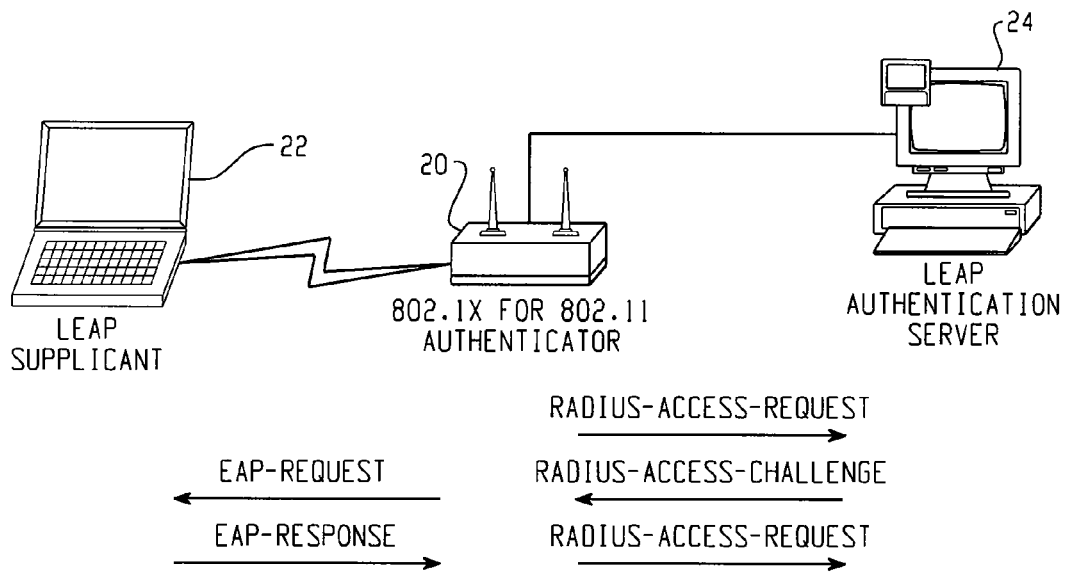

The Authenticate Phase of EAP-Cisco Wireless Authentication is shown in FIG. 5. The authenticate sequence can vary based on the mutual authentication method chosen between the client 22 and the authentication server 24. For example, with the present EAP-Cisco Wireless authentication, the sequence of messages occurs as described in the preferred embodiment of FIG. 5. In the preferred embodiment as shown in FIG. 6, the EAP-Response/Identity message from the client/supplicant 22 is forwarded to the RADIUS server 24 by the AP 20 in the form of a RADIUS-Access-Request with EAP extensions, in which EAP is encapsulated in the RADIUS protocol. The RADIUS server 24 then responds back to the access-request with a RADIUS-challenge, which then gets responded to by the client 22, in accordance with the RADIUS protocol described in RFC 2138. The present EAP-Cisco Wireless authentication is a mutual authentication method with the access point 20 in the middle acting solely as a transport vehicle. For example, the access point 20 in the authenticate phase moves the contents of the packets from EAP to RADIUS and vice versa. In this way, no logon functions are performed through the AP, thereby precluding network access to rogue APs.

Alternately, the present invention can support other message types, such as Transport Level Security (TLS) as described in RFC2286 to transfer certificates in a PKI implementation, in which EAP-TLS described in RFC2716 messages would be used. Other such message types can also be used without departing from the invention.

Figure 7:
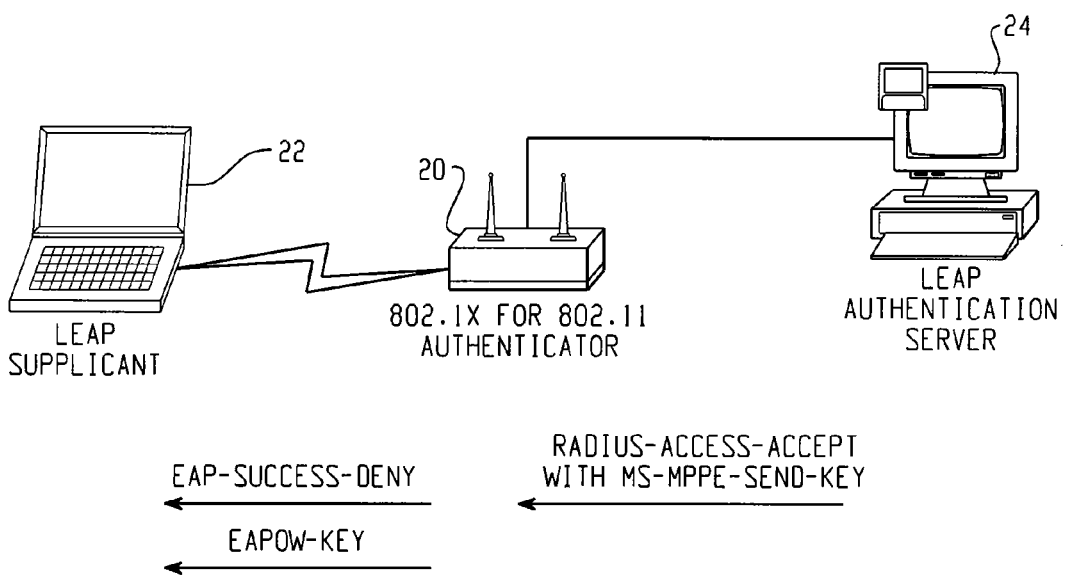

The finish phase of the present EAP-Cisco Wireless Authentication is shown in FIG. 7. If the user is discovered to be invalid, the RADIUS server 24 sends a RADIUS deny packet with an embedded EAP fail. If the user is discovered to be valid, the server 24 sends a RADIUS-Access-Accept packet with an EAP success attribute. The RADIUS-Access-Accept message also contains the MS-MPPE-Send-Key attribute defined by RFC2548 to the access point 20. The key needs to be sent to the access point 20 in order for it to obtain the session key that the client 22 will be using to talk with it. Both the client 22 and the RADIUS server 24 who are using the EAP-Cisco Wireless authentication derive the session key from the user's password. The IEEE 802.11's encryption may be based on a 40/64-bit or 104/128-bit key. The key derivation routines provide a key longer than needed. When the access point 20 receives the key from the RADIUS server 24 (via the MS-MPPE-Send-Key attribute) it sends an EAPOL-KEY message to the client 22 supplying the key length and key index to use. The key value (or actual WEP key) is not sent since the client 22 has already derived it on its own using preloaded algorithms and reference data corresponding to those preloaded into the authentication server. The packet is encrypted using the full-length derived key. The access point 20 also sends an EAPOL-KEY message supplying the length, key index and value of the multicast/broadcast key. This packet is also encrypted using the full-length derived session unicast key. This completes the entire mutual authentication and key derivation and transfer between the EAP-Cisco Wireless Authentication Server 24 and the EAP-Cisco Wireless Supplicant 22. Thus, the intermediary access points 20 only pass the encrypted packets, and do not "share the secret," i.e. do not possess the means to decrypt the packets. In this way, the clients of the WLAN have become invulnerable to rogue AP attacks.

The present invention is particularly useful for detecting rogue access points that may seek to access the network. During the start phase of authentication, the client/supplicant 22 directs a packet to the network, e.g. the server 24, through the AP/authenticator 20. A network response packet is received by the client/supplicant 22 from the network, through the AP/authenticator 20. In order to detect a rogue access point, the client/supplicant 22 performs a routine of determining whether the access point 20 is a valid network access point or a rogue access point. This determination is based on whether the received network response packet is in conformity or nonconformity with predetermined expectations. The "predetermined expectations" can include the "shared secret" information disclosed hereinabove or any other standard applied for determining conformity.

In the preferred embodiment, a valid network access point 20 conforms with expectations if it forwards data traffic from the network conforming with IEEE 802.1X standards. If the forwarded data traffic is determined by the client/supplicant 22 to not conform, the access point is determined to be a rogue access point. Further, in another preferred embodiment, a valid network access point 20 is determined to conform with predetermined expectations if the mutual authentication disclosed hereinabove is successful. Nonconformity is determined by the failure of the mutual authentication. After issuing a challenge from the server 24 to the client 22, the client 22 issues a counter-challenge back to the server 24. Mutual authentication fails at the counter-challenge step if the username and password of the access point are not found in the server's database. At that point, the access point is identified as a rogue AP.

In the event the access point 20 is determined to be a valid network access point, the access point 20 and supplicant 22 are authenticated to the network. If the access point is determined to be a rogue access point, it is reported as such to the network. In one aspect, the rogue access point is reported to the network by the client 22 through a valid network access point 20, at a later time after the client 22 has contacted a valid AP and authenticated to the network.

The EAP-Cisco Wireless Authentication and Key distribution can be deployed in a large campus. EAP-Cisco Wireless supplicant or client software is preferably supported by a variety of operating systems, including Windows 95, Windows 98, Windows NT 4.0, Windows 2000, Windows Millennium, WinCE 3.0, Mac OS 9.x, and any other type of platform that may be commonly used. The client authentication can be set-up to work in the default open/shared-key modes defined by the standards or in EAP-Cisco Wireless mode.

As described hereinabove, the present disclosure identifies the important requirements for large-scale enterprise WLAN solutions and summarizes the limitations of first generation WLAN security solutions and the types of security attacks they are susceptible to. The present disclosure outlines the architecture of next generation WLAN solutions that mitigate these concerns. The present disclosure also demonstrates the extensibility built into this framework through support for several mutual authentication schemes, thus offering investment protection as well as a future-proof design. Using WLAN solutions in accordance with the present invention, enterprises can now confidently deploy and benefit from large-scale wireless networks without compromising network security.

As described hereinabove, the present invention therefore solves many problems associated with previous type methods and implementations. However, it will be appreciated that various changes in the details, materials and arrangements of parts which have been herein described and illustrated in order to explain the nature of the invention may be made by those skilled in the are within the principle and scope of the invention will be expressed in the appended claims.

We claim:

1. A method of detecting a rogue access point by a client comprising the steps of:

directing a message from the client node to a network through a first access point, the first access point configured to exchange wireless signals with the client node to communicatively couple the client node to the network, to an authentication server, disposed on the network, the message containing identity credentials;

receiving a network response packet by the client node from the first access point responsive to directing a message from the client to a network through a first access point;

determining that the first access point is a rogue access point by the client node based on the network response packet received from the access point in being in nonconformity with predetermined expectations;

sending a start message from the client node to a second access point, the second access point configured to exchange wireless signals with the client node to communicatively couple the client node to the network;

sending an identity request message from the second access point to the client node responsive to the sending a start message;

forwarding the identity response message from the second access point to the authentication server;

validating the identity credentials by the authentication server;

forwarding a send key from the authentication server to the client node through the second access point, the send key comprising key length and key index to specify encryption parameters for a session key;

reporting the first access point as a rogue access point by the client node to the network through the valid access point;

wherein the message reporting the first access point as a rogue access point is encrypted with the session key.

2. The method of claim 1 wherein the predetermined expectations comprise data traffic conforming with Institute of Electrical and Electronic Engineers 802.1X standards.

3. The method of claim 1 wherein the predetermined expectations comprise a mutual authentication to the network, wherein nonconformity is determined by a failure of the mutual authentication.

4. The method of claim 3 wherein the mutual authentication comprises:

issuing a challenge from an authentication server to the client node;

issuing a counter-challenge from the client node to the authentication server;

wherein mutual authentication fails at the counter-challenge since the first access point's username and password are not found in the authentication server's database.

5. The method of claim 1 wherein the identity credentials are a username/password combination.

6. The method of claim 1 wherein the authentication server is a Remote Authentication Dial-In User Service server and wherein the identity response message is in the form of a Remote Authentication Dial-In User Service access request, wherein the method further comprises the steps of:

responding to the Remote Authentication Dial-In User Service access request with a Remote Authentication Dial-In User Service challenge from the authentication server to the client; and responding from the client to the Remote Authentication Dial-In User Service challenge according to the Remote Authentication Dial-In User Service protocol.

7. The method of claim 6 wherein the steps of validating and forwarding comprise sending the client node a Remote Authentication Dial-In User Service accept message and wherein the send key comprises an MicroSoft-Microsoft Point-to-Point Encryption-Send-key.

8. The method of claim 1 wherein the encryption parameters are based on one of a 40/64-bit and a 104/128-bit key.

9. The client of claim 1 wherein the predetermined expectations comprise a mutual authentication to the network, wherein non-conformity is determined by a failure of the mutual authentication.

10. A client node configured as a supplicant for detecting a rogue access point comprising:

means for directing a message from the supplicant to a network through a first access point, the first access point configured to exchange wireless signals with the client node to communicatively couple the client node to the network, to an authentication server disposed on the network, the message containing identity credentials;

means for receiving a network response packet by the supplicant from the first access point responsive to the means for directing a message from the supplicant to a network through a first access point;

means for determining the first access point is a rogue access point based on the network response packet received from the access point being in nonconformity with predetermined expectations;

means for sending a start message from the supplicant to a second access point, the first access point configured to exchange wireless signals with the client node to communicatively couple the client node to the network;

means for sending an identity request message from the second access point to the supplicant responsive to the means for sending a start message;

means for sending an identity response message containing the identity credentials from the supplicant to the second access point in response to the identity request message means for forwarding the identity response message from the second access point to the authentication server;

means for validating the identity credentials of the supplicant using the authentication server;

means for forwarding a send key from the authentication server to the supplicant through the second access point, the means for forwarding a send key comprises means for supplying key length and key index to specify encryption parameters for a session key;

means for independently deriving a session key from the send key and the identity credentials by the supplicant and the authentication server;

means for encrypting data packets between the supplicant and the authentication server using the derived session key;

means adapted for reporting the first access point as a rogue access point through the second access point that the client is able to authenticate via the means for directing, the means for receiving and the means for determining.

11. The client of claim 10 wherein the predetermined expectations comprise data traffic conforming with Institute of Electrical and Electronic Engineers 802.1X standards.

12. The client of claim 1 wherein the identity credentials are a username/password combination.

13. The client of claim 10 wherein the authentication server is a Remote Authentication Dial-In User Service server and wherein the identity response message is in the form of a Remote Authentication Dial-In User Service access request, wherein the arrangement further comprises:

means for responding to the Remote Authentication Dial-In User Service access request with a Remote Authentication Dial-In User Service challenge from the authentication server to the supplicant;

and means for responding from the supplicant to the Remote Authentication Dial-In User Service challenge according to the Remote Authentication Dial-In User Service protocol.

14. The client of claim 10 wherein the means for validating and forwarding comprise means for sending the supplicant a Remote Authentication Dial-In User Service accept message and wherein the send key comprises an MicroSoft-Microsoft Point-to-Point Encryption-Send-key.

15. The client of claim 10 wherein the encryption parameters are based on one of a 40/64-bit and a 104/128-bit key.

16. The client of claim 10 wherein the supplicant, second access point and authentication server are part of a wireless local area network.

17. The client of claim 10, wherein means for determining the first access point is a rogue access point is based on a counter-challenge step of a mutual authentication when the username and password of the first access point are not found by the authentication server.

18. The client of claim 10, wherein means for determining the first access point is a rogue access point receives keying material from the authentication server and derives the session key from the keying material and determines a corresponding session key derived by the first access point does not match the session key.

19. A wireless client node, comprising:
   a supplicant, the supplicant is configured for authenticating with a first access point, the first access point configured to exchange wireless signals with the client node to communicatively couple the client node to a network, and upon successful authentication with the first access point, the supplicant is configured to issue a counter-challenge to the first access point;
   the supplicant is responsive to receiving a response to the counter-challenge from the first access point to determine the response to the counter-challenge is invalid;
   the supplicant responsive to determining the response to the counter-challenge is invalid to authenticate with a second access point configured to exchange wireless signals with the client node to communicatively couple the client node to the network, the supplicant sending an identity response message responsive to an identity request message received from the second access point;
   the supplicant responsive to receiving keying material from the second access point, the keying material comprising a key length and key index to specify encryption parameters for a session key to derive the session key;
   the supplicant responsive to deriving the session key to issue a counter-challenge and validate a corresponding session key derived by the access point;
   the supplicant responsive to validating the corresponding session key derived by the access point to encrypt packets using the derived session key; and
   the supplicant is responsive to validating the corresponding session key to send a message through the second access point reporting the first access point as a rogue access point encrypted using the derived session key.

* * * * *